UNITED STATES PATENT OFFICE.

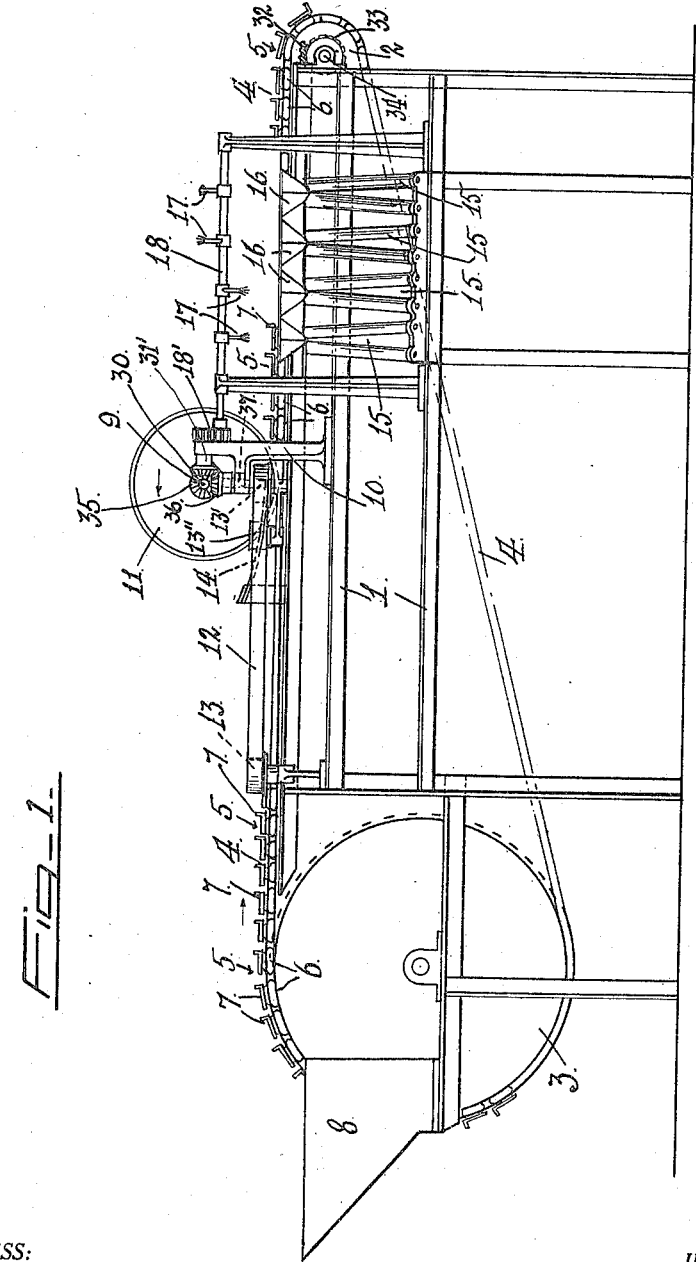

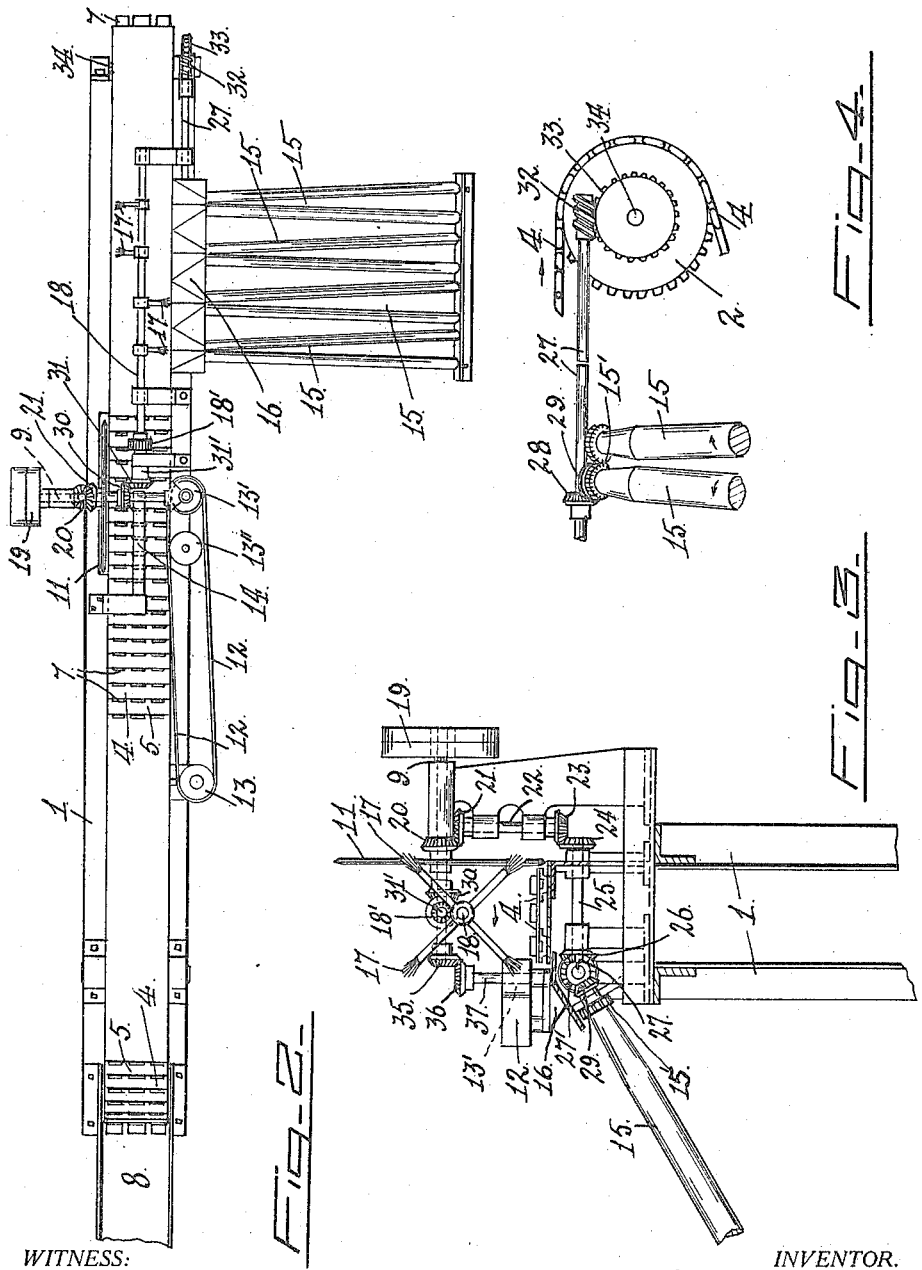

DAVID LOW AND ALBERT R. THOMPSON, OF SAN JOSE, CALIFORNIA; SAID THOMPSON ASSIGNOR TO SAID LOW.

COMBINED ASPARAGUS CUTTER AND GRADER.

1,257,719.   Specification of Letters Patent.   Patented Feb. 26, 1918.

Application filed November 6, 1917. Serial No. 200,487.

*To all whom it may concern:*

Be it known that we, DAVID LOW and ALBERT R. THOMPSON, citizens of the United States, residing at San Jose, in the county of Santa Clara and State of California, have invented certain new and useful Improvements in Combined Asparagus Cutters and Graders, of which the following is a specification.

Our invention relates to the class of machines for reducing elongated vegetables to uniform length. The invention, though applicable to various substances and materials is especially intended for asparagus.

It is customary for the farmer or producer to so pack the boxes which he sends to the cannery that the shoots lie in uniform relation, that is with their tips all in the same direction.

In devising our machine we take advantage of this initial care to feed them in the same relation, and to preserve this relation throughout the operations of reducing the shoots to uniform length, and to discharge them in said relation, so that we are able to incorporate in the machine a grading instrumentality which receives them directly in such relation, and sorts them as to thickness.

Our invention, therefore, comprises a carrier to receive and advance the shoots, with their tips lying all in the same direction; means acting on said tips to so shift the shoots on the carrier, that the tips will lie even; means for severing the butts of the tips uniformly, whereby the shoots are made of uniform length; means for discharging the uniformly reduced shoots endwise, thereby preserving their initial relation; and a grader to directly receive the shoots in said relation and sort them as to thickness.

This will more fully appear hereinafter, in connection with the description of the machine assisted by reference to the accompanying drawings, in which, Figure 1 is a side elevation of our machine.

Fig. 2 is a plan of the same.

Fig. 3 is a rear end view.

Fig. 4 is a detail of the grader roll and carrier drive.

1, is the frame of the machine. Upon terminal sprockets 2 and 3, carried by the frame is an endless traveling carrier 4 the surface of which is formed or provided with transverse parallel spaced pockets 5. In its present form the carrier comprises a chain foundation 6, adapted for regular, uniform travel over the sprockets, and angle-iron members 7 constituting the pockets, which are open at each end. 8 is a feed hopper, through which the carrier passes, and in which the asparagus stems or shoots are directed into the uprising pockets of the carrier.

Upon a shaft 9 carried by columns 10 rising from the frame 1 is mounted a cutter 11, which rotates in a vertical plane beside one end of the carrier pockets, its lower portion extending down past the pocket end, in order to evenly cut off the projecting butts of the shoots, carried in said pockets. Associated with the other open ends of the carrier pockets is a traveling evener belt 12. This is mounted on terminal pulleys 13 and 13', and said belt is so disposed that from the pulley 13 at a predetermined distance in advance of the cutter, it converges toward the side of the carrier, until it reaches a guide pulley 13'' by which it is directed parallel with the carrier for a relatively short distance to the pulley 13'. This evener belt lies opposite the open ends of the carrier pockets so that the tips of the shoots carried in the pockets, as they reach the sphere of action of the belt come in contact therewith and the shoots are gradually and evenly shifted over in the pockets, until said tips all lie substantially flush with the pocket ends, their butts protruding from the other ends of the pockets, to be themselves evenly cut off by the cutter. 14 is a presser finger, overlying and guarding the pockets in the vicinity of the cutter. At one side of the machine beyond the cutter, is the grader. In the form here shown, this grader comprises a pair of vertically inclined rolls 15 axially rotatable in relatively opposite directions and divergent from the upper to their lower ends. In practice we employ a plurality of such roll-pairs, four pairs being here shown.

16, are chutes for directing the asparagus stems from the carrier pockets, on to the grader rolls. These chutes lie beside the open ends of the carrier pockets, and the delivery of the asparagus is effected by means of a revolving brush 17. There are, in the present instances, four such brushes, set quartering on a shaft 18, each brush successively coming down into contact with the upper surface of an asparagus stem and moving it out of the pocket into its respective chute.

The driving connections are as follows:

Power is led into the machine from the pulley 19, Figs. 2 and 3 on the shaft 9 which carries the cutter 11, whereby the latter is driven.

Upon shaft 9 is a bevel gear 20 which meshes with a bevel gear 21, on a counter shaft 22, the other end of which carries a bevel gear 23. This latter gear meshes with a bevel gear 24 on a counter shaft 25, the other end of which carries a bevel gear 26, which meshes with a bevel gear 27' on a shaft 27. This shaft 27 carries bevel gears 28 Fig. 4, which mesh with bevel gears 29 on the upper ends of the grader rolls 15, whereby said rolls are driven, the rolls being themselves geared at 15' Fig. 4 to rotate in opposite directions. The shaft 9 also carries a bevel gear 30, which meshes with a bevel gear 31 on a short shaft 31' which is geared at 18' to the shaft 18 which carries the brushes 17, whereby the latter are driven. The shaft 27 which drives the grader rolls is extended beyond the rolls and carries a worm 32 which meshes with a worm gear 33 on a shaft 34 which carries the sprocket 2 and through said sprocket, the carrier 4 is driven. Finally the shaft 9 carries a bevel gear 35 Fig. 3 which meshes with a bevel gear 36 on a shaft 37 which carries the pulley 13' of the evener belt 12, whereby the latter is driven.

It will thus be seen that all the moving parts are driven from one source, and they may therefore be accurately timed and regulated. The operation of the machine is as follows: The asparagus shoots are supplied to the hopper 8 and as the pockets 5 of the carrier 4 rise up through the hopper the shoots are picked up by them. The tips of the shoots all lie in the same direction being so readily fed from the boxes in which they come from the producer, as they all lie in the same direction in said boxes. When the shoots reach the sphere of the evener belt 12 their tips are pressed upon by the belt, and due to the convergence of the latter to the path of travel of the carrier, the shoots are gradually shifted over in the pockets, until the tips all lie even, approximately flush with the pocket ends. The butts of the shoots protrude unevenly from the other ends of the pockets, but while the tips are held even by the parallel portion of the belt 12 between pulleys 13'' and 13' the unevenly disposed butts reach the cutter 11 which cuts them all off even. The shoots, now all of even length, reach the discharge brushes 17 which successively force them out into the chutes 16 and they pass down by gravity on to the respective grader rolls 15 by which they are sorted with respect to their thickness and drop down into receivers or bins, not shown.

In dealing with this subject, the chief consideration is to preserve all the way through, including the grading operation, that uniformity of position with respect to tips and butts, which the initial packing of the shoots in the producer's boxes affords, and which is absolutely essential to proper grading. It will readily be seen that if after the cutting into lengths, the uniformity of positions were lost as would be the case if the cutting devices delivered the shoots indiscriminately, it would be necessary to expend time and labor in rearranging them, for the grading operation. But with the machine herein disclosed, the shoots which are preliminarily disposed in the boxes all in the same direction, can be so supplied readily to the machine, in the same relation; and after the cutting into uniform lengths, this relation is preserved, and in such relation they are delivered to the grader for the sorting operation under favorable conditions. Beyond this it does not matter, how they fall into the bins.

We claim:

1. A machine for the described purpose, comprising a traveling carrier to receive and advance the shoots in uniform relation with respect to butts and tips; means operating on said shoots during their advance for giving them uniform length; means for discharging them from the carrier in said uniform relation; and a grading means to receive them in such relation from the discharging means and sort them as to thickness.

2. A machine for the described purpose, comprising a traveling carrier to receive and advance the shoots in uniform relation with respect to butts and tips; means acting on the tips during their advance by the carrier to shift said shoots endwise until said tips are even; means for evenly cutting off the butts of the shoots whereby said shoots are made of equal length; means for discharging the shoots from the carrier in said uniform relation; and a grading means to receive the shoots in such relation from the discharging means and sort them as to thickness.

3. A machine for the described purpose, comprising a traveling carrier to receive and advance the shoots in uniform relation with respect to butts and tips; a traveling belt beside and inclined to the path of travel of the carrier to press upon the tips of the shoots and move them over endwise on the carrier until said tips are even; an associated cutter to evenly cut off the butts of the shoots, whereby said shoots are made of equal length; means for discharging the shoots from the carrier in said uniform relation; and a grading means to receive the shoots in such relation from the discharging means and sort them as to thickness.

4. A machine for the described purpose comprising a traveling carrier to receive and advance the shoots in uniform relation with respect to butts and tips; means operating on said shoots during their advance for giving them uniform length; a revolving instrumentality operating over said carrier to engage uniformly reduced shoots and discharge them from the carrier in their initial relation as to butts and tips; and a grading means to receive the shoots in such relation and sort them as to thickness.

5. A machine for the described purpose, comprising a traveling carrier to receive and advance the shoots in uniform relation with respect to butts and tips; means acting on the tips during their advance by the carrier to shift said shoots endwise until said tips are even; means for evenly cutting off the butts of the shoots whereby said shoots are made of equal length; a revolving instrumentality operating over said carrier to engage the uniformly reduced shoots and discharge them from the carrier in their initial relation as to butts and tips; and a grading means to receive the shoots in such relation and sort them as to thickness.

6. A machine for the described purpose, comprising a traveling carrier to receive and advance the shoots in uniform relation with respect to butts and tips; a traveling belt beside and inclined to the path of travel of the carrier to press upon the tips of the shoots and move them over endwise on the carrier until the said tips are even; an associated cutter to evenly cut off the butts of the shoots, whereby said shoots are made of equal length; a revolving instrumentality operating over said carrier to engage the uniformly reduced shoots and discharge them from the carrier in their initial relation as to butts and tips; and a grading means to receive the shoots in such relation and sort them as to thickness.

7. A machine for the described purpose, comprising a traveling carrier to receive and advance the shoots in uniform relation with respect to butts and tips; a traveling belt beside and inclined to the path of travel of the carrier to press upon the tips of the shoots and move them over endwise on the carrier until said tips are even; an associated cutter to evenly cut off the butts of the shoots, whereby said shoots are made of equal length; a plurality of staggered brushes adapted to successively engage the uniformly reduced shoots and discharge them from the carrier in their initial relation as to butts and tips; and a plurality of grading devices associated with said brushes, respectively, to receive the shoots in such relation and sort them as to thickness.

8. A machine for the described purpose, comprising a traveling carrier with transverse open-ended pockets to receive the shoots; means acting on the tips of the shoots to force said shoots over endwise in the pockets until their tips are even; a cutter for uniformly severing the butts of the shoots while in the pockets whereby the shoots are made of uniform length; means for discharging the uniformly reduced shoots from the pockets by sliding them endwise therefrom; and a grading device to reduce said shoots from the pockets endwise and sort them as to thickness.

9. A machine for the described purpose comprising a traveling carrier with transverse open-ended pockets to receive the shoots; a traveling belt opposite one end of the carrier pockets and inclined for a portion of its length to the path of travel of the carrier and thence extending parallel therewith to act upon the tips of the shoots to force them over in the pockets until said tips are even and to temporarily so hold them; a revolving cutter for uniformly severing the butts of the shoots while so positioned whereby said shoots are made of uniform length; a revolving device to contact with said uniformly reduced shoots and to slide them endwise from the pockets; and a grading device to receive said shoots from the pockets endwise and sort them as to thickness.

In testimony whereof we have signed our names to this specification in the presence of two subscribing witnesses.

DAVID LOW.
ALBERT R. THOMPSON.

Witnesses:
J. A. ZRELING,
F. C. BROWN.

Copies of this patent may be obtained for five cents each, by addressing the "Commissioner of Patents, Washington, D. C."